(12) United States Patent  (10) Patent No.: US 7,634,514 B2
Langan et al.  (45) Date of Patent: Dec. 15, 2009

(54) SYNCHRONIZING FILE SYSTEM DIRECTORIES

(75) Inventors: Thomas A. Langan, Seattle, WA (US); Brian S. Aust, Redmond, WA (US); Navjot Virk, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 11/124,739

(22) Filed: May 9, 2005

(65) Prior Publication Data

US 2006/0253501 A1  Nov. 9, 2006

(51) Int. Cl.
*G06F 12/00* (2006.01)
(52) U.S. Cl. .................. 707/203; 707/200; 707/201
(58) Field of Classification Search .................. 707/1
See application file for complete search history.

(56) References Cited

U.S. PATENT DOCUMENTS

| 5,778,389 | A  | * | 7/1998  | Pruett et al.     | 707/204 |
| 6,070,254 | A  | * | 5/2000  | Pratt et al.      | 714/43  |
| 6,147,773 | A  | * | 11/2000 | Taylor et al.     | 358/400 |
| 6,745,303 | B2 | * | 6/2004  | Watanabe          | 711/161 |
| 7,051,064 | B1 | * | 5/2006  | Yamagishi et al.  | 709/200 |
| 7,395,281 | B2 | * | 7/2008  | Edwards           | 707/203 |
| 2002/0174180 | A1 | * | 11/2002 | Brown et al.   | 709/203 |
| 2003/0105654 | A1 | * | 6/2003  | MacLeod et al. | 705/7   |
| 2003/0191827 | A1 | * | 10/2003 | Piispanen et al.| 709/221 |
| 2004/0039889 | A1 | * | 2/2004  | Elder et al.   | 711/162 |
| 2006/0041596 | A1 | * | 2/2006  | Stirbu et al.  | 707/200 |
| 2007/0198746 | A1 | * | 8/2007  | Myllyla et al. | 709/248 |

\* cited by examiner

*Primary Examiner*—Tim T. Vo
*Assistant Examiner*—Aaron Sanders
(74) *Attorney, Agent, or Firm*—Workman Nydegger

(57) ABSTRACT

Described is a system and method that facilitates fast and reliable synchronization of computer/file system directories. A synchronization (FastSync) subsystem operates in a discovery/enumeration phase to provide a calling client with a set of the differences between directories, and then operates in an action phase to perform operations as directed by the client to synchronize the different directories. The discovery/enumeration and action phases use parallel operation and I/O (input/output) pipelining. Multiple threads are used during enumeration to enumerate each directory's children, and enqueues each sub-directory to be handled by a new thread. During the action phase, when an operation is requested, the FastSync subsystem packages up the operation, item pointer, and context information into an internal context block and queues that packet as a work item for a process thread pool to handle.

17 Claims, 7 Drawing Sheets

SYNCHRONIZING FILE SYSTEM DIRECTORIES

FIELD OF THE INVENTION

The invention relates generally to computer systems, and more particularly to computer files and directories.

BACKGROUND

Computer users often need to disconnect from a network and work offline, such as when traveling, working at home, or at times when the network is down. As a result, various mechanisms have been directed to caching network information on a local computer to allow the information to be accessed when the local computer is disconnected from the network. Local caching also reduces the amount of data communicated between the network servers and a client working in an offline mode. Benefits to reducing the amount of transmitted data include a reduction in the server workload, a reduction in the client's perceived latency, and an increase in available network bandwidth.

Working offline usually changes the state of the offline directory hierarchy relative to the server directory hierarchy. Changes to the directories in the hierarchies can come in the form of a file change such as a change of attributes or a data write, or in the form of a namespace change such as the creation of a new file or directory, or the deletion of a file.

Regardless of the change or changes, at some point it becomes necessary to perform some process to synchronize the offline client and server directories into a synchronized state. In a synchronized state, the two directory hierarchies have the same subdirectory structure, containing the same filenames within those directories. Also, for each file that exists in both directories, the files need to contain the same data in their data streams and have the same associated attributes, timestamps and other file system information.

However, synchronizing the cached offline items with the server file system's items (directories and files) is complex, relatively slow and has always suffered from problems. What is needed is a fast and reliable way to synchronize offline files.

SUMMARY OF THE INVENTION

Briefly, the present invention is directed towards a multi-phase system and method that facilitates the synchronization of directories and their files, such as to synchronize a directory maintained in a local, offline cache with another directory in a remote network file system. To this end, a fast and reliable synchronization (FastSync) subsystem operates in a discovery/enumeration phase to provide a calling client with a set of the differences, and then in an action phase performs operations as directed by the client to synchronize the different directories.

In the discovery/enumeration phase, the FastSync subsystem determines the differences that exist between directories, any including namespace differences such as a file having been deleted from one directory but not its counterpart directory, or differences between the attributes and/or contents of two files. In one implementation, a synchronization structure, such as a tree of nodes that describe the differences, is returned to the client caller by the FastSync subsystem.

The synchronization tree structure is built as a subset of the directory namespace that contains nodes representing items (files or directories) that have changed. To save on memory usage, nodes are not placed in the tree for unmodified items, although simple nodes are maintained in the tree for unchanged subdirectories with changed items below them, to preserve the correct hierarchical organization. Each item to synchronize contains a sync status field that describes a current state, e.g., whether a file has changed from its original state on one directory or the other, or both, or whether it exists only in one directory because it is newly-created in the directory where it exists, or has been deleted from the directory from which it is missing.

The client caller analyzes the returned structure as desired, and then requests that the FastSync subsystem take specified actions that are directed towards bringing the directories into a synchronized state. In the action phase, the FastSync subsystem carries out synchronization primitives (operations which may be combined into a more complex action) as directed by the client.

In one implementation, the discovery/enumeration and action phases of the FastSync subsystem leverage parallel operation and I/O (input/output) pipelining, including by using multiple threads during each phase. For example, during enumeration, each thread opens the same path under both directories, and enumerates the children (files and directories). The thread enqueues each sub-directory to be handled by a new thread, and then processes the differences within that directory by modifying the tree to include sync items for the changed elements. The FastSync subsystem also uses directory enumerations rather than file enumerations. As each enumeration discovers new directories, those directories in turn are queued for enumeration by another thread. It is thus possible for a directory and its subdirectories to be processed in parallel by different threads. This maximizes CPU utilization and takes advantage of I/O pipelining, particularly over the network. On the network, such pipelining reduces the effect of latency on the total time to synchronize.

During the action phase, when an operation is requested, the FastSync subsystem packages up the operation, item pointer, and context information into an internal context block and queues that packet as a work item for a process thread pool to handle. Note that internal queuing ensures that actions are executed in the proper order. When a thread is available to work on an operation, the FastSync subsystem extracts an item from this queue and performs the work, making callbacks to the caller as necessary. If the action is successful, the overall process can be considered as returning the thread to the thread pool until later needed for another item. If not successful, the client may allow some number of retries, or the item added back to the work list, e.g., by returning a failure code to the caller.

Other advantages will become apparent from the following detailed description when taken in conjunction with the drawings, in which:

DETAILED DESCRIPTION

Exemplary Operating Environment

Figure 1:
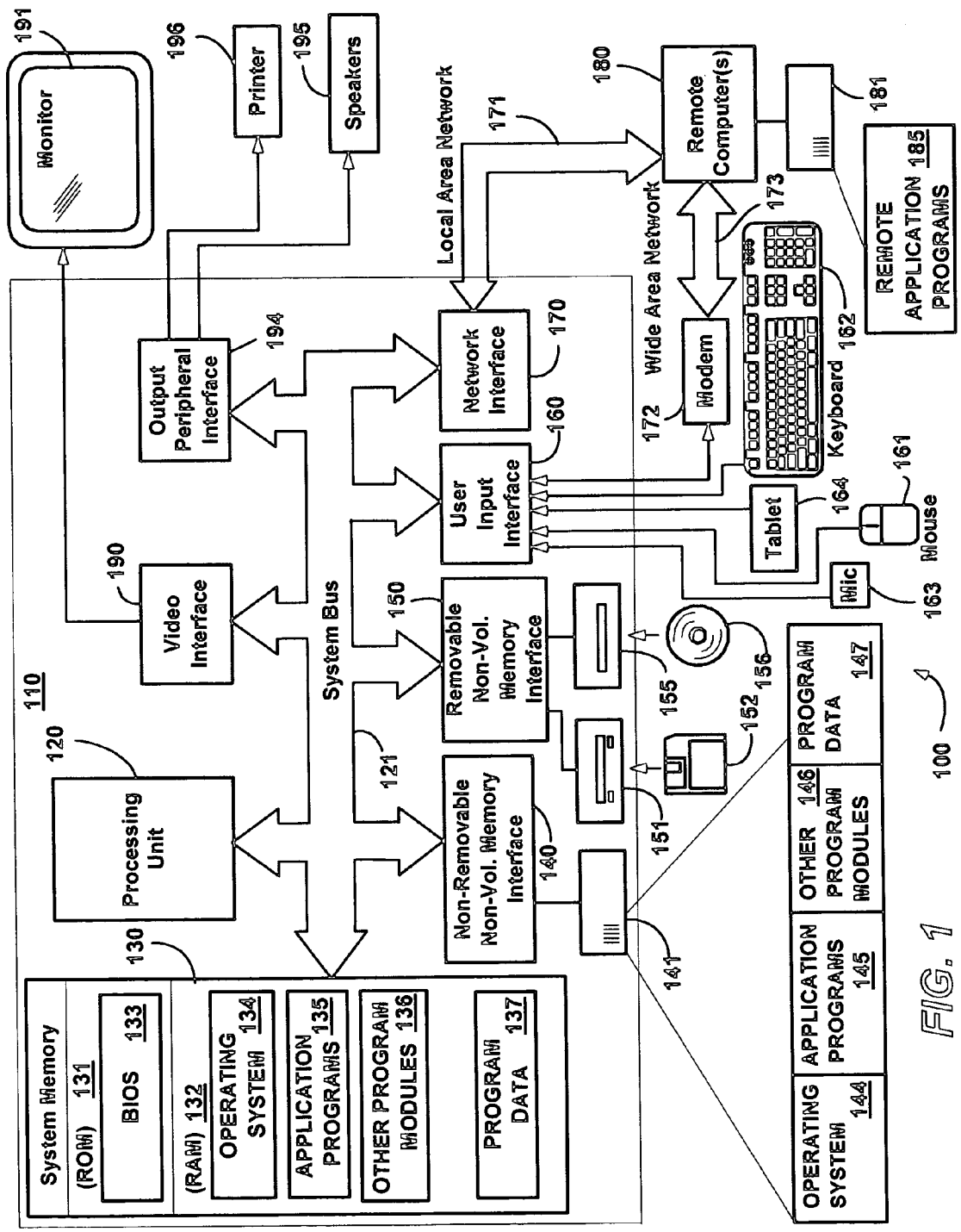
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Synchronizing Local and Remote Files and Directories

The present invention is generally directed towards a system and method by which directories, such as in a local offline cache and a remote network file system, are synchronized. To this end, the present invention discovers what differences exist between the directories, enumerates the differences to a calling client, and then takes actions as requested by the client, e.g., to issue the file system-related commands that are needed to reach a synchronized state. As will be understood, numerous ways to implement the present invention are feasible, and only some of the alternatives are described herein. For example, the present invention is primarily described below with reference to a multi-phase, multi-threaded model that performs of number of synchronization-related operations in parallel. Notwithstanding, other types of arrangements are feasible, and the present invention is not limited to any particular examples used herein, but rather may be used various ways that provide benefits and advantages in computing in general.

Figure 2:
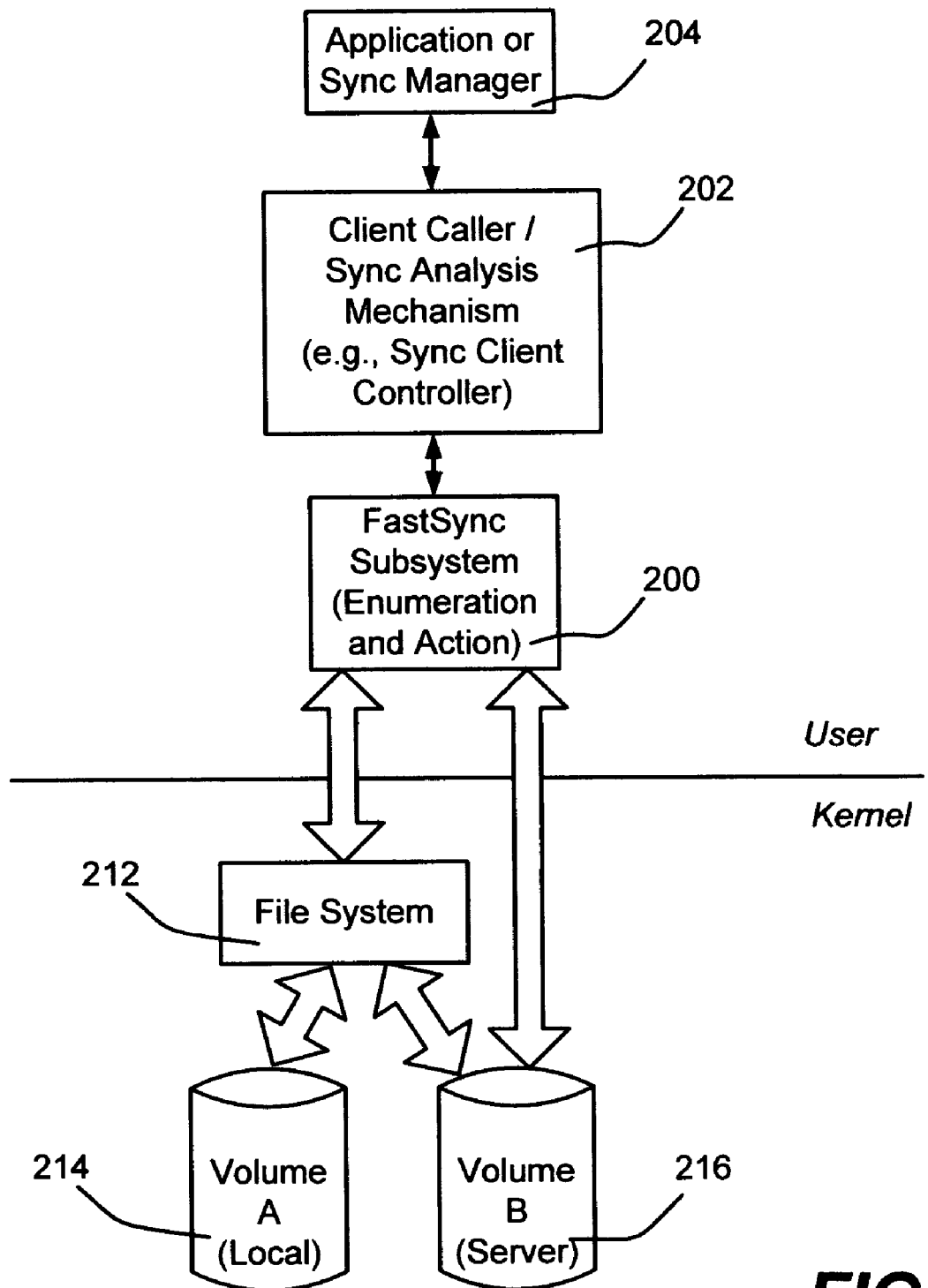
FIG. 2 is a block diagram comprising a general example architecture for implementing synchronization with a fast and reliable synchronization subsystem in accordance with various aspects of the present invention.

With respect to multi-phase operation, in one implementation, a synchronization subsystem operates in a discovery phase to locate and enumerate differences between two directory structures to be synchronized, and an action phase in which synchronization primitives (operations which may be combined into a more complex action) are carried out. This provides a very fast, reliable mechanism for a client caller mechanism, which operates in an analysis phase, to leverage. As will be understood, the subsystem in this implementation provides for significant parallel operation and I/O (input/output) pipelining, and thus facilitates rapid synchronization, whereby the subsystem is referred to herein (for brevity) as the FastSync subsystem 200 (FIG. 2).

In general, in this example implementation, the FastSync subsystem 200 component enumerates the differences between directories and carries out synchronization-related requests, but does not make the decisions as to how to synchronize the directories. The FastSync subsystem 200 instead reports the state of a directory in the enumeration phase, and takes explicit commands from a client caller 202 (FIG. 2) in an action phase as to what operation or operations (corresponding to an action) are to be taken to synchronize individual files or directories. This allows for different types of callers to interface with the FastSync subsystem 200, such as interactive applications that need to obtain user input to synchronize, or group policy processors and scripts that need to run in the background without prompting the user. One suitable client caller 202 comprises a client-side controller of a caching service, described in copending U.S. patent application Ser. No. 11/032,870, filed Jan. 10, 2005, assigned to the assignee of the present invention and hereby incorporated by reference. Note that in this service model, the service allows an application program or synchronization manager program 204 to have synchronization functionality without performing much of the complex synchronization analysis.

In general, in this implementation, the FastSync subsystem 200 does not contain the logic for resolving out-of-sync conditions. One reason is that this allows different callers to synchronize in different ways. The FastSync subsystem 200 action operations instead provide primitives, such as set forth in the following example operations (synchronizing two directories, A and B):

---

Create new file/directory in A
Create new file/directory in B
Copy information (data stream/attributes) from file in A to one in B
Copy information (data stream/attributes) from file in B to one in A
Delete a file/directory in A
Delete a file/directory in B
Copy a full sub-tree from A to B
Copy a full sub-tree from B to A
Delete a full sub-tree in A
Delete a full sub-tree in B
Make a copy of a file from A to a backup location
Make a copy of a file from B to a backup location

---

The operations are high-level enough that the caller does not have to worry about details, but it gives the caller the option to resolve conflicts in different ways. For example, a caller may sometimes (but not always) want to make a backup of a file before deleting it or overwriting it; such behavior is possible in this system. As another example, a caller may always want to make folder B look like folder A in certain circumstances, no matter whether folder A has changed or not. In such an event, the caller can simply select the operations that would delete or overwrite the changes in B, then copy the new content from A to B.

Note that not having analysis logic in the FastSync subsystem 200 simplifies it in some ways, but makes things more complicated in other ways. A complication is that it is always necessary for the FastSync subsystem 200 to provide up-to-date and correct information about the state of a file or directory, e.g., by updating data structures.

Turning to FIG. 2, the example arrangement represented therein includes the application/synchronization manager 204, the client caller/sync analysis mechanism 202 and the FastSync subsystem 200. In one implementation, these components communicate via defined sets of interfaces.

The FastSync subsystem 200 accesses directory information via a file system 212 and/or suitable remote interface (not shown) on a volume A 214 and a volume B 216. Although FIG. 2 shows a local volume 214 and server volume 216 which is typically a network server on a remote volume, the present invention is not limited to any particular volume arrangements. Indeed, the present invention is able to synchronize files on two remote volumes, two local volumes, and even can be adapted to synchronize two directories on the same volume. The present invention may also support mount point volumes, wherein a mount point volume is essentially a volume mounted in a directory of another volume. Thus, although the present invention is described with the typical examples of synchronizing a local volume (or some directory-based subset thereof) with a remote volume, these are only non-limiting examples.

Figure 3:
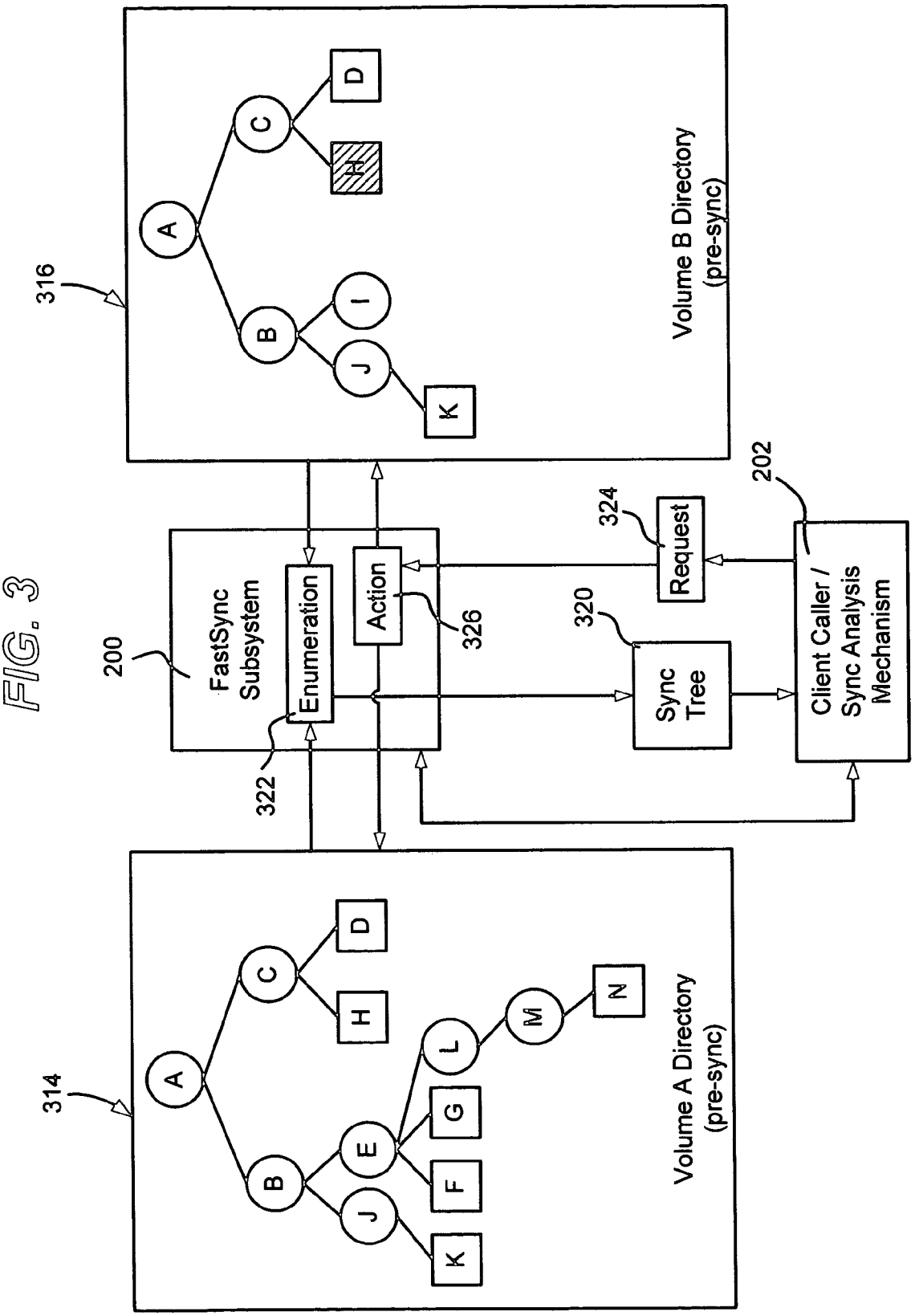
FIG. 3 is a block diagram comprising directories for synchronization in accordance with various aspects of the present invention.

As represented in FIG. 3, in the enumeration phase, the FastSync subsystem 200 evaluates two directories, 314 and 316, which may start at the root directory of the local volume and a corresponding user namespace on a server (but may be subdirectories that correspond to one other). Note that in FIG. 3, directories are shown as circles, while files are shown as squares. Further note that the enumeration phase may use multiple threads for fast operation, as described below.

In general, following the enumeration phase, the client caller 202 obtains from the FastSync subsystem 200 a synchronization state data structure containing information about items to be synchronized. In the example implementation of FIG. 3, the structure is arranged as a synchronization tree 320. As described below, the client caller 202 evaluates that information, consults system policy and the like when necessary, and directs the FastSync subsystem 200 to perform one or more synchronization-related actions (primitives) on those items. This is represented in FIG. 3 by the action request 324 being provided by the client caller 202 to an action handling component 326.

To provide the synchronization tree data structure 320, the FastSync subsystem 200 efficiently examines each directory's state, to report differences between directories to the caller. The synchronization tree 320 is built as the subset of the directory namespace that contains files or directories that have changed. To save on memory usage, unmodified files do not show up in the tree, and directories that do not contain changed content, or have not changed themselves, are not included in the tree. Note however that directories that have not changed, but have files in them that have changed, are maintained as simple nodes in the tree so as to preserve the correct hierarchical organization.

Figure 4:
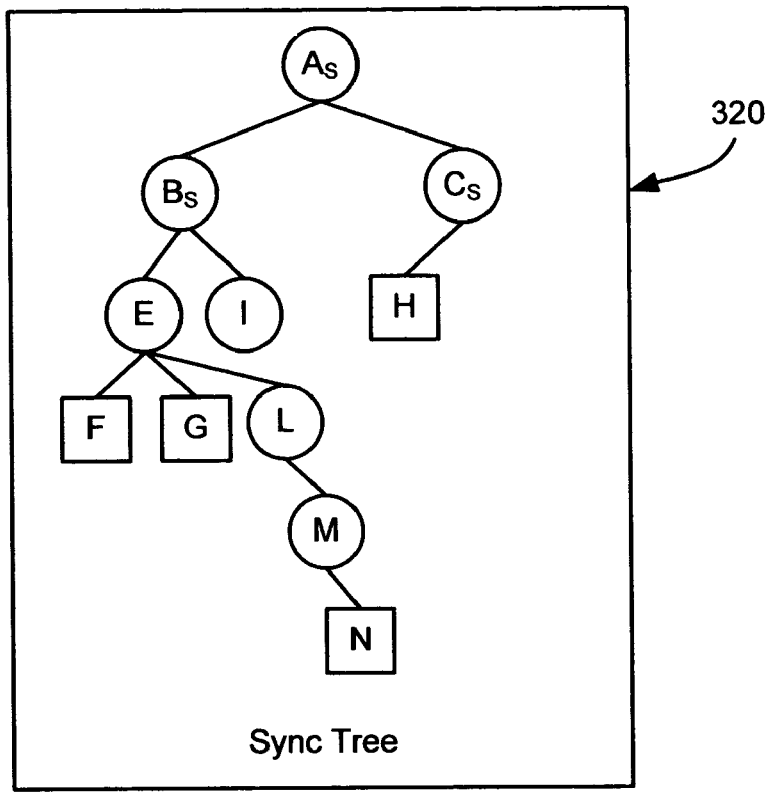
FIG. 4 is a representation of a synchronization tree developed by the synchronization subsystem in an enumeration phase in accordance with various aspects of the present invention.

FIG. 4 represents the synchronization tree 320 containing difference nodes constructed from the example directories to be synchronized in FIG. 3. In FIG. 4, simple nodes in the tree that are present for preserving the hierarchical organization are denoted by the subscript S character. Further, analogous to FIG. 3, in FIG. 4 nodes representing directories are shown as circles, while nodes representing files are shown as squares.

As can be seen, the nodes that are in the synchronization tree 320 correspond to namespace differences or differences between files (attributes and/or contents). For example, in FIG. 4, nodes E and I (and E's child nodes) are not in both directories, and thus these namespace differences are nodes in the synchronization tree 320 along with their child nodes. The node J and its child file K are the same in each, and are thus not included in the synchronization tree 320 for purposes of efficiency. Further, there are file differences in file H, as represented by the shaded box in directory structure 316 of FIG. 3, and thus this file is included in the synchronization tree 320 along with a simple node C as its parent.

Figure 5:
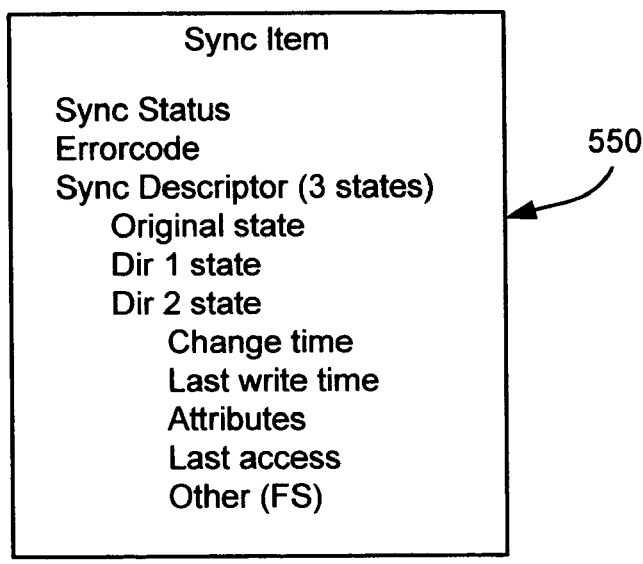
FIG. 5 is a representation of an example data structure used to maintain data for an item to synchronize, in accordance with various aspects of the present invention.

As represented in FIG. 5, each node in the tree 320 (other than simple nodes) contains a data structure 550 of the information for one sync item, which is either a file or directory. Sync items contain a sync description, which represents the original, synchronized state of the sync item, as well as the way or ways each item has changed since it was last in a synchronized state. For example, for a file that has been modified, the sync item would contain the original Last Write Time, file size, attributes, and so forth, from the synchronized state, as well as the current values for those fields for the copies from both directories, if a copy exists; (note that at least one set of values must be different from the original or it would not be out-of-sync).

In addition, each sync item contains a sync status field that describes the "state" of the file. For example, the sync status indicates whether the file has changed from its original state on one directory or the other or both, or whether it exists only in one directory because it is newly-created in the directory where it exists, or has been deleted from the directory from which it is missing. The sync status is granular enough that the caller can use it as a basis for applying its state machine to select an operation or operations to perform in order to synchronize the item.

The caller 202 uses the synchronization tree 320 and the items therein to perform analysis, such as described in the aforementioned U.S. patent application Ser. No. 11/032,870. Based on this analysis, the caller 202 then requests that the FastSync subsystem perform one or more actions directed to bringing the directories into a synchronized state.

More particularly, in response to operation requests from the caller 202, the FastSync subsystem 200 may make the necessary calls to a client-side caching driver and server volume driver (e.g., redirector) to perform the requested operations and other operations, and report progress/status back to the caller 202. Although not necessary to the present invention, in one implementation, when an operation is requested, the FastSync subsystem 200 packages up the operation, item pointer, and context information into an internal context block and queues that packet as a work item for a process thread pool to handle. Note that internal queuing ensures that actions are executed in the proper order. When a thread is available to work on an operation, the FastSync subsystem 200 extracts an item from this queue and performs the work, making callbacks to the caller 202 as necessary. Further note that FastSync subsystem operations are asynchronous. However, because callbacks may execute at any time from one of many thread pool threads, callback context has no particular thread affinity and calls to client progress and conflict handling implementations are thus serialized, e.g., by the caller 202. The caller 202 may also reflect the progress/status back to the calling application program 204 (FIG. 2).

Figure 6:
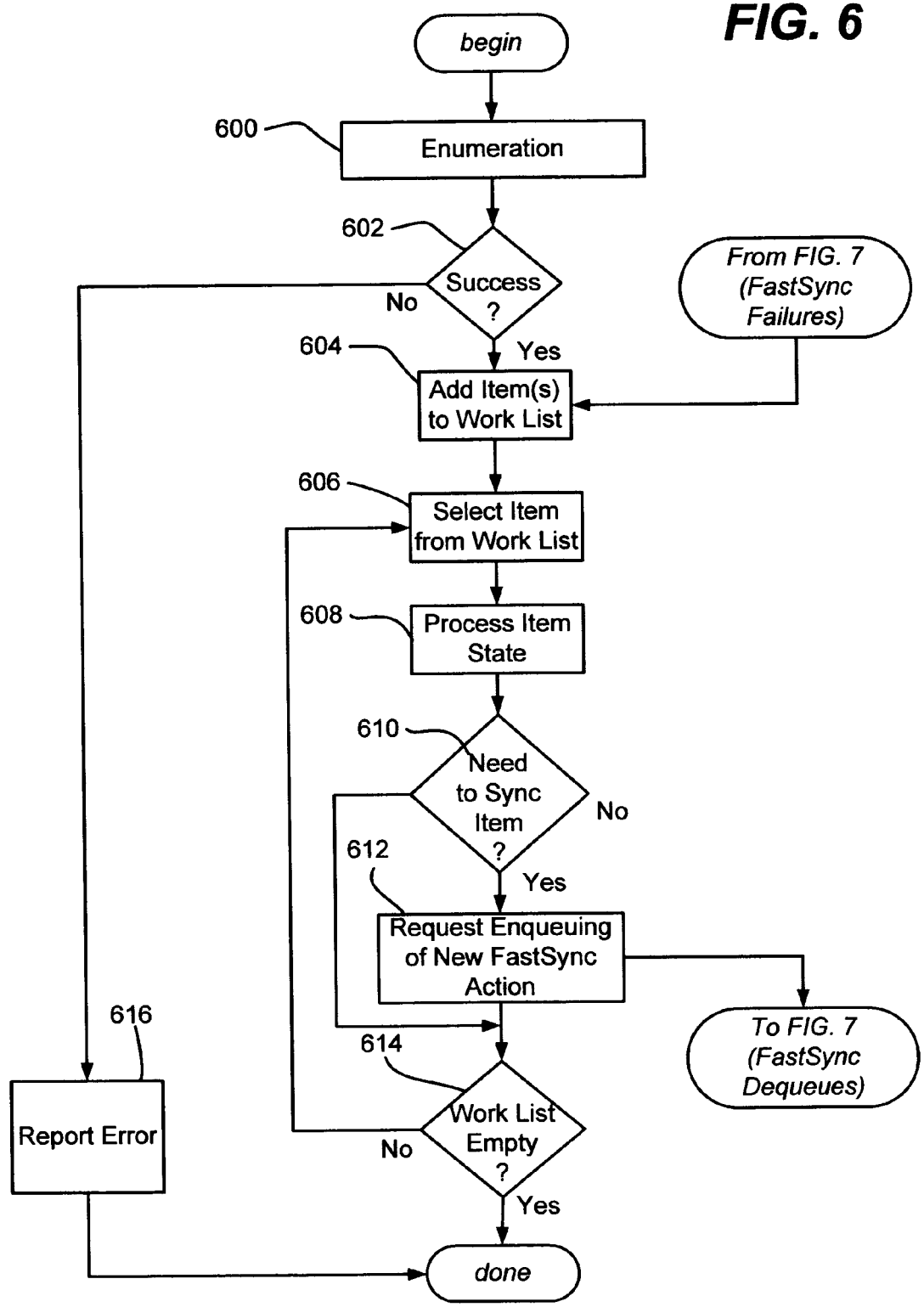
FIGS. 6 and 7 are flow diagrams representing example logic generally directed towards synchronizing directories in accordance with various aspects of the present invention.

FIG. 6 represents a typical control/flow for a caller 202 of the FastSync subsystem 200. In FIG. 6, as represented via step 600, the caller 202 requests that the FastSync subsystem 200 perform the above enumeration phase. If not successful for some reason as evaluated at step 602, (e.g., the server is not responding), the process ends with a suitable error reported via step 616.

In a typical situation in which no error occurs, step 602 instead branches to step 604 to add one or more action items to a work list; (note that this work list is not the same as the above-described internal FastSync subsystem work item queue that the caller serializes). In general, the work list represents a collection of sync items that are to be processed by the caller.

Step 606 represents selecting an item from the work list, with step 608 representing the processing of that selected item. In one implementation, the initial enqueuing of files includes walking the tree via a depth-first traversal, to choose the initial action for each item and for adding the items to this list, comprising a revolving queue. Note that at step 606, work items can arrive from the initial walk of the tree, as well as from errors (via step 710, described below), with the process essentially iterating on the queue until there are no work items left, as also described below.

Thus, in general, processing the item determines the action that is to be requested for the item, decides whether the item has an error that is unrecoverable, or concludes that the item is already synchronized. If the item is one that needs to be synchronized, step 610 and 612 represent requesting of enqueuing of that item for action by the FastSync controller 200.

Step 614 repeats the selection, processing and possible enqueuing steps until the work list is empty. When empty, the caller operations are complete, although it is possible that an item will be added back to the work list in the event of the inability of the FastSync subsystem 200 to properly perform the requested action, as described below. The synchronization is actually complete when the FastSync subsystem 200 has successfully completed all of its processing, and there is no sync item left for the caller to process.

Figure 7:
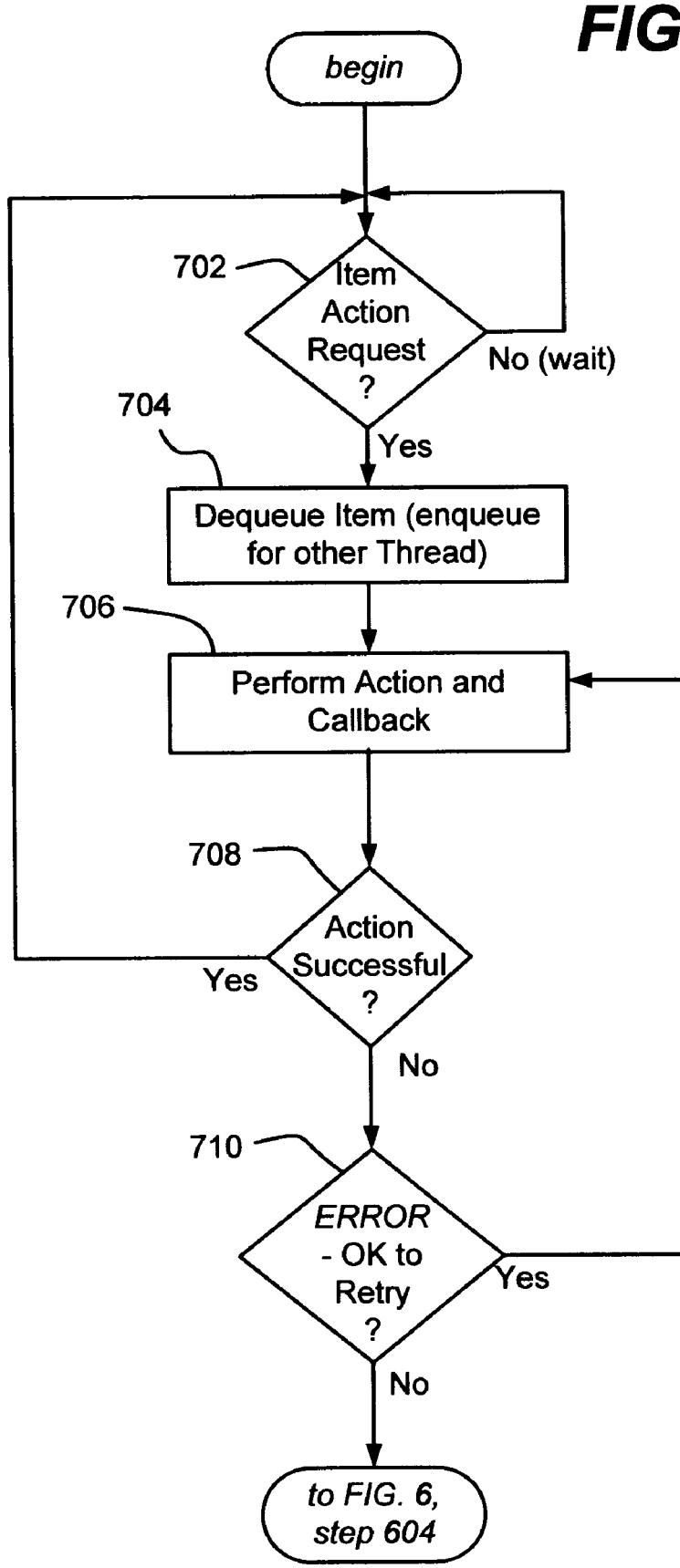

Whenever an action is enqueued (e.g., by an API call to FastSync subsystem 200) at step 612, the FastSync subsystem 200 may dequeue it as soon as it has resources (e.g., an available thread) to do so. In general, FIG. 7 represents these operations, including waiting at step 702 for an item in the queue. In one implementation, dequeued items are enqueued in another queue for consumption by another thread, thereby facilitating parallel operation as described below.

In this parallel implementation, the FastSync subsystem 200 processes operations on sync items via separate threads, and thus the steps below step 704 represent the control flow after the completion (successful or not) of the execution of an operation, as performed by separate threads. In general, actions are attempted and callbacks made as represented by step 706. If the action is successful (step 708), the overall process can be considered as returning the thread to the thread pool until later needed for another item. If not successful, the client may allow some number of retries, as represented by step 710 returning to step 706. If not allowed to retry, the item is added back to the work list as represented in FIG. 6 by returning from FIG. 7 to step 604, e.g., by returning a failure code to the caller.

Figure 8:
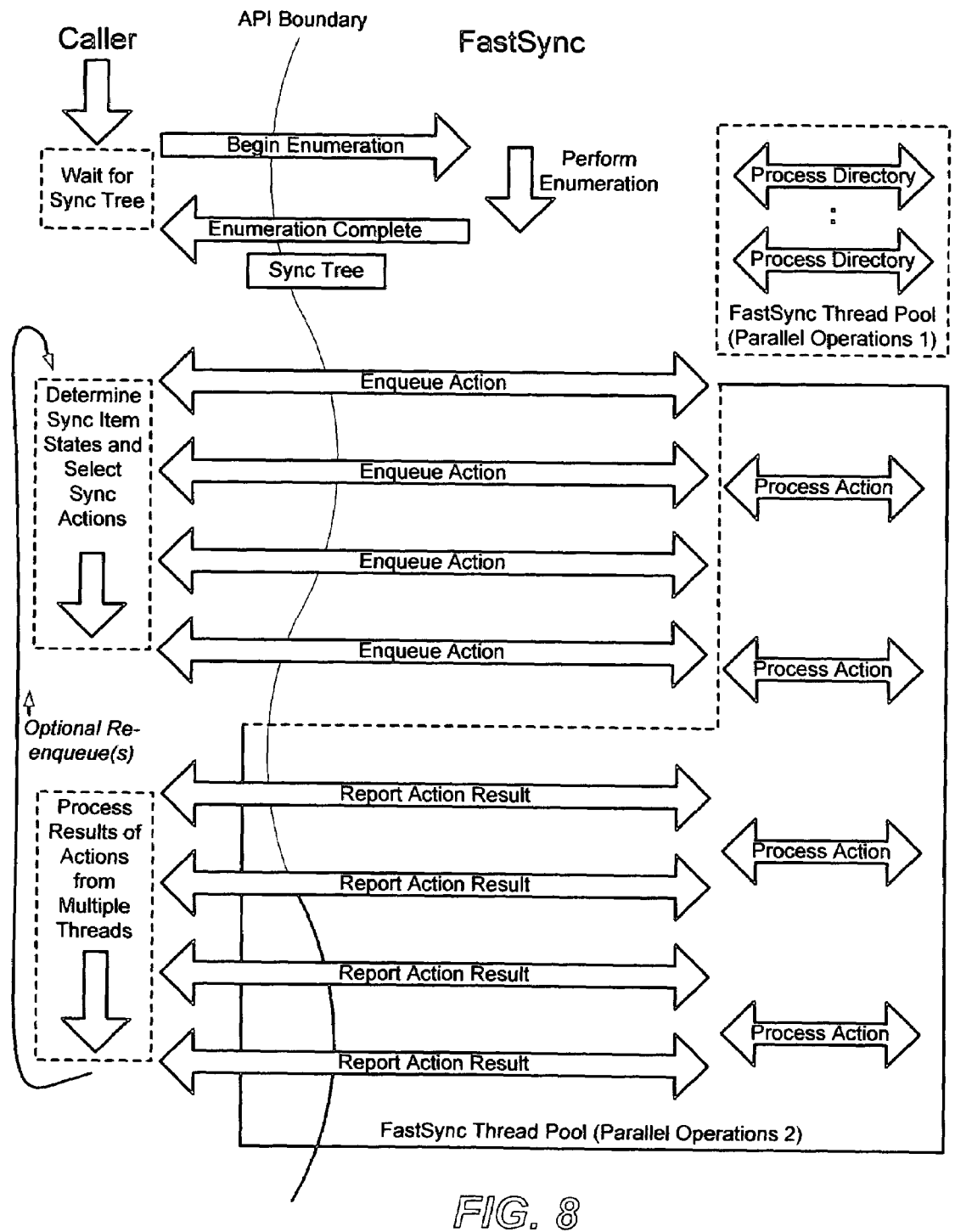
FIG. 8 is a representation of various interactions between a client caller and the fast and reliable synchronization subsystem, in accordance with various aspects of the present invention.

FIG. 8 explains the parallel processing in more detail, primarily representing a caller's view of the FastSync subsystem 200 application programming interface (API). At a high level, synchronization using the FastSync subsystem 200 has two phases, namely enumeration and action as described above. The purpose of enumeration is to quickly and efficiently find and report on the parts of the directories that need to be synchronized and report the differences to the caller 202 in some logical manner. During the action phase, the caller 202 has chosen one or more operations for each file or directory that is out-of-synchronization, which are intended to return the item to a synchronized state.

The caller 202 may use a FastSync subsystem API set to enqueue operations, in which the FastSync subsystem 200 simply adds them to a queue and returns immediately. The FastSync subsystem 200 performs the operations using multiple threads in parallel, which each take a pending operation from the queue and execute it. Once each operation is complete, the FastSync subsystem 200 notifies the caller by executing a callback provided when the operation was enqueued. The caller can then evaluate the result of the operation, and attempt to retry the operation if it failed, or enqueue a new operation on that file or directory.

Note that the only point where the caller gives up control of its calling thread for an appreciable amount of time is during the enumeration phase, during which the FastSync subsystem 200 does not return control until enumeration is complete (successful or not), although it provides frequent callbacks that allow the caller to modify the behavior of enumeration or to abort enumeration altogether. During the action phase, the caller's requests to enqueue operations, which are associated with Sync Items, return relatively quickly since little work is done by the FastSync subsystem 200 to add them to queue of operations to be performed.

At the end of the action phase, when a the FastSync subsystem 200 thread has finished performing its work, it executes a callback provided when the operation was enqueued, to return information on the result of the operation and the sync item that represents the file or directory that was operated on in the action. The callback occurs on a separate thread from the one used to enqueue the operation to the FastSync subsystem 200. Within the callback, the caller has the option to retry the operation, in which case the caller will receive another callback reporting the result of the retried operation. Otherwise, even if the caller does not wish to retry the exact same operation during the completion callback, it can enqueue a new operation (either the same operation as before or a new operation) for the same sync item later.

In this manner, parallel operation and I/O pipelining (multiple threads for processing and I/O to reduce idle time), are generally maximized, while total data transferred is minimized. To this end, in one implementation, multiple threads are used both during enumeration and action, as generally represented in FIG. 8, in which the FastSync subsystem 200 enumerates the content of both directory trees on multiple threads and returns when all threads complete processing.

During enumeration, each thread opens the same path under both directories, and enumerates all the children (files and directories). The thread enqueues each sub-directory to be handled by a new thread, and then processes the differences within that directory by modifying the tree to include sync items for the changed elements.

One other aspect of the FastSync subsystem 200's method of enumeration is that it does so without opening every file in the directory to be synchronized. Opens are expensive, particularly over the network. In order to determine the properties of a file (such as change times, size and attributes) by opening every file, the file would have to be opened, the file information queried for, and the file closed. On a local system, each of these three operations requires entering the operating system, and on a remote file system, this means at least three round-trips over the network, and possibly more overhead.

To avoid this expense, the FastSync subsystem 200 instead uses directory enumerations. For a directory enumeration, it is only necessary to open the directory once, after which each query on that handle fetches information about multiple files without actually opening them. Then, it is necessary to close the directory. A primary difference is that by leveraging directory enumeration, there is only one open and one close per directory, instead of one for every file and directory. Further, having only one query directory produces the information for many files, as opposed to one query information for each file and directory using a per-file method (files and directories are generally equivalent in terms of operating system and round-trip expense). In addition to minimizing round-trip exchanges with the server, this also reduces the total amount of data transferred, due to the reduced overhead.

As each enumeration discovers new directories, those directories in turn are queued for enumeration by another thread. Therefore, it is possible for a directory and all of its subdirectories to be processed in parallel by different threads. This maximizes CPU utilization and takes advantage of I/O pipelining, particularly over the network. On the network, such pipelining reduces the effect of latency on the total time to synchronize.

During the action phase, multiple threads handle the operations enqueued by the caller with each action running and completing on a single thread, that is, one thread per action, with multiple actions executing simultaneously.

As can be readily appreciated, for reliability, the system should gracefully handle interruptions and unavailability of parts of the file system (e.g., due to sharing violations) with the ability to retry any operation multiple times. For enumeration, the enumeration phase will not fail if an individual file or directory fails to be enumerated. Instead, the FastSync subsystem 200 will report that that particular node in the sync tree was unable to be enumerated. The caller can initiate a new enumeration starting from that sub-tree at a later point in time.

The action phase may contain more sophisticated failure handling logic. For example, when the FastSync subsystem 200 reports that an operation failed for a particular sync item, it updates the item to reflect the new SyncState and the file's relevant information (such as attributes, size, and change times). The caller has the option to signal the FastSync subsystem 200 to retry the previous action immediately (and receive another callback when the retried operation completes), or to wait and at any point enqueue the sync item for the same operation or a new operation.

By having this flexibility, it is possible for the caller to implement a rich set of possibilities for responding to the result of an operation. For example, it is possible for the caller to respond to a sharing violation by waiting for some amount of time and then retrying the operation by enqueing it in hopes that the application that had the file open closed its handle(s). In addition, it is possible for the caller to run the item through an arbitrarily complex state machine after every failure (e.g., in many cases, the same state machine that was initially used to determine how to synchronize the file). In that way, it is possible for the caller to run sync items through a single stateless system that determines how to synchronize a file, over and over. That system may include interactively asking the user what to do, referring to machine or domain policies, making backup copies of files, and so forth.

Moreover, the present invention reduces the impact on the usability of the file system, in that it recognizes that files or directories should not be locked for long periods of time. One problem with synchronizing a whole directory tree at once for the sake of efficiency and speed, as opposed to synchronizing one file at a time, is that it is not practical to hold a file exclusively, e.g., by opening a handle that forbids write operations by other applications. However, when synchronizing one file at a time, it is acceptable to hold the file exclusively, ask the caller what to do with it, and then perform the action without releasing it. The FastSync subsystem 200 attempts to avoid draining system resources and annoying application users by not holding every single modified file or directory from enumeration all the way through the completion of the last operation.

To this end, the FastSync subsystem 200 enumerates the directory hierarchies via directory enumeration, which allows directory operations such as queries and file/subdirectory creation, but does not prevent writes to files. During the action phase, the FastSync subsystem 200 verifies that the file is in the same state as it was during enumeration; typically, the file is in the same state as during enumeration, but it is possible it may have changed. If the file has changed between enumeration and action, then it is possible that a different operation is appropriate from the one that was selected. In such a situation, the FastSync subsystem 200 completes the operation without touching the file or directory, and reports a failure code explaining to the caller that a change has occurred. The caller has the opportunity to respond immediately to retry the operation or to cancel the operation. At a later point, it is possible for the caller to submit a new action for that item. The caller can also instruct the FastSync subsystem 200 to ignore certain aspects of the file that can change in innocuous ways.

Thus, the only time the FastSync subsystem 200 opens a file (thus locking it to some degree from other file system accesses) is for a short time during enumeration and then during action while an operation is being processed. Because it accepts interruptions gracefully, the FastSync subsystem 200 and its callers can handle inconsistencies between the enumeration and action phases as well. Note that with a transactional file system (such as Transactional NTFS, as described in U.S. Pat. No. 6,856,993), it is also possible for the FastSync subsystem 200 to associate a transaction context with a sync item to provide the ability to roll-back synchronization changes.

Although not necessary to the present invention, the caller should provide callbacks for any per-file or per-directory processing it needs to perform during the operation of the FastSync subsystem 200. Although the FastSync subsystem 200 drives enumeration and action, there are instances where the caller may need to perform some processing and provide feedback to the FastSync subsystem 200. In those instances, callbacks are used so that the FastSync subsystem 200 can prompt the user. One example is during enumeration, in which the caller may choose to synchronize only a subset of total available directories and ignore others. One example is when certain directories are actually mounted remote file systems on slow connections, or when there are directories that are known to contain only read-only data. The FastSync subsystem 200 can provide callbacks to the caller so that before enumerating a directory, it executes the callback to essentially ask the caller what to do. The caller can then respond to the FastSync subsystem 200 by indicating whether it should enumerate the directory, skip it, or abort enumeration altogether.

Another example is during the action phase, while copying a newly created sub-directory, when it may be important for the caller to know about every file and avoid copying certain files or directories. For example, it may be important to keep certain types of files such as copyrighted content off of a certain file server, or it may be important not to copy a remote file system-mounted sub-directory. For that reason, callbacks are provided while copying a directory tree, whereby the caller can choose to skip certain files or directories or cancel the copy altogether.

As can be seen from the foregoing detailed description, there is provided a model for synchronization in which enumeration and action methodologies are essentially self-contained and driven by a FastSync subsystem, while allowing the caller to have the control it needs over the synchronization process. The synchronization process is fast and reliable, as well as flexible to allow various callers the ability to obtain enumerated information and request actions. The present invention thus provides numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method for synchronization of file system directories, the method comprising:
    enumerating differences between the directory structures of a first directory and a second directory, the enumerating comprising parallel operation of multiple threads, and the enumeration comprising a thread opening a path under both the first directory and the second directory and enumerating all the children of each directory;
    for each new directory discovered during an enumeration, enqueuing the new directory for enumeration in a separate thread;
    creating a plurality of sync items,
        each sync item comprising a plurality of fields representing a sync description representing an original state of a file or directory, a state in the first directory, a state in the second directory, a change time indicating when a change occurred from an original state in one directory, the other directory, or both, and an error code, and
        each sync item corresponding to a file or directory in either the first directory or the second directory;
    building a synchronization tree structure comprising a subset of a directory namespace which includes each of the files and directories of the first directory and the second directory,
        comprising the enumerated differences between the first and second directories,
        comprising a node for each file which has changed between the first directory and the second directory,
        comprising a node for each directory which has changed between the first directory and the second directory,
        comprising a simple node for each directory which is not itself changed but which contains a file or directory which has changed between the first and second directories, and
        comprising a sync item corresponding to each node which is not a simple node;
    returning the enumerated differences between the first and second directories to a client caller for analysis;
    receiving one or more operation requests from a caller;
    packaging an operation, an item pointer, and context information into an internal context block;
    queuing the context block as a work item in a queue for a process thread pool to handle;
    ensuring that queuing actions are handled in the proper order;
    extracting an item from the queue;
    when the item is associated with a file, verifying that the file is in the same state as it was during enumeration; and
    performing an operation to synchronize the directories in response to the operation requests.

2. The method of claim 1, further comprising returning the synchronization tree structure comprising enumerated differences between the directories to a client caller for analysis.

3. The method of claim 2, wherein the synchronization tree structure comprises a tree of nodes, each node in the tree representing a file or a directory within the first directory or the second directory, each node corresponding to either namespace differences or file differences between the first and second directories, and at least at least one node containing information related to a file or directory which is not synchronized.

4. The method of claim 3 wherein each node which is not a simple node comprises a data structure comprising
    a sync description,
    a sync status,
    a last write time,
    a size, and
    attributes.

5. The method of claim 1 wherein performing an operation to synchronize the directories comprises processing a set of primitive operations that are combined into a complex action.

6. The method of claim 1 wherein enumerating differences between the directory structures comprises using multithreaded directory enumerations to determine the differences between two directory trees.

7. The method of claim 1 wherein performing an operation comprises extracting multiple items from the queue and handling multiple operations simultaneously, in parallel, by separate threads.

8. The method of claim 7, further comprising reporting a result of a completed operation in a callback.

9. The method of claim 1 wherein at least one of the first or second directories is a mount point volume.

10. At least one computer-readable storage medium having encoded thereon computer-executable instructions which, when executed, perform the method of claim 1.

11. The computer-readable storage medium of claim 10 wherein returning the enumerated differences to the client caller comprises returning the synchronization tree structure to the caller.

12. The computer-readable storage medium of claim 10 having further computer-executable instructions comprising using a transaction-based mechanism to roll back synchronization changes on at least one file.

13. The computer-readable storage medium of claim 10 wherein enumerating differences between the directory structures comprises using multithreaded directory enumerations.

14. The computer-readable storage medium of claim 10 wherein performing operations comprises queuing synchronization-related operations for handling in parallel by separate threads.

15. The computer-readable storage medium of claim 14 having further computer-executable instructions comprising returning a result of a completed operation to the caller in a callback.

16. The computer-readable storage medium of claim 14 having further computer-executable instructions comprising retrying a failed operation.

17. The computer-readable storage medium of claim 14 having further computer-executable instructions comprising ensuring that an item to synchronize has not changed state since receiving one or more operation requests.

* * * * *